United States Patent
Lin et al.

(10) Patent No.: US 7,076,477 B2
(45) Date of Patent: Jul. 11, 2006

(54) FAST AND ROBUST OPTIMIZATION OF COMPLEX DATABASE QUERIES

(75) Inventors: Eileen Tien Lin, San Jose, CA (US); Guy Maring Lohman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 588 days.

(21) Appl. No.: 10/248,132

(22) Filed: Dec. 19, 2002

(65) Prior Publication Data

US 2004/0122798 A1    Jun. 24, 2004

(51) Int. Cl.
*B06F 17/30* (2006.01)
(52) U.S. Cl. .......................................................... 707/2
(58) Field of Classification Search ................... 707/1, 707/2, 3, 5; 706/62
See application file for complete search history.

(56) References Cited

U.S. PATENT DOCUMENTS

| | | | |
|---|---|---|---|
| 5,671,403 A * | 9/1997 | Shekita et al. ................. 707/3 |
| 5,701,461 A | 12/1997 | Dalal et al. ................. 395/604 |
| 6,138,111 A | 10/2000 | Krishna .......................... 707/2 |
| 6,272,483 B1 * | 8/2001 | Joslin et al. ................... 706/62 |
| 2004/0059732 A1 * | 3/2004 | Vaucher ......................... 707/5 |

OTHER PUBLICATIONS

K. Ono and G. M. Lohman, "Measuring the Complexity of Join Enumeration in Query Optimization," Proceedings of the 16th Very Large Data Bases (VLDB) Conference, Brisbane, Australia (1990), pp. 314-325.
G. M. Lohman, "Heuristic Method for Joining Relational Data Base Tables," IBM Technical Disclosure Bulletin, vol. 30, No. 9 (Feb. 1988), pp. 8-10.
F. P. Palermo, "A Data Base Search Problem," Proceedings of the 4th Symposium on Computer and Information Science, Miami Beach, FL (Dec. 1972), Plenum Press as "Information Systems: COINS IV" (Julius T. Tou, ed.), 1974, pp. 67-101.
M. Jarke and J. Koch, "Query Optimization in Database Systems," Computing Surveys 16, 2 (Jun. 1984), pp. 111-152.

* cited by examiner

*Primary Examiner*—Etienne P. LeRoux
(74) *Attorney, Agent, or Firm*—Lacasse & Associates, LLC; Randy W. Lacasse; Ramraj Soundararajan

(57) ABSTRACT

A robust way is described for optimizing complex data base queries while retaining the optimization speed of heuristic methods. The heuristic join-sequencing algorithm is modified to permit any of, or a combination of: (1) multiple passes of the heuristic algorithm, each with a different metric, producing multiple plans; (2) complex combinations of the criteria by which such heuristics make their choices; and/or (3) backtracking to consider alternatives to any particular decision in the sequence.

31 Claims, 2 Drawing Sheets

FAST AND ROBUST OPTIMIZATION OF COMPLEX DATABASE QUERIES

BACKGROUND OF INVENTION

1. Field of Invention

The present invention relates generally to the field of database management systems. More specifically, the present invention is related to optimizing complex database queries.

2. Discussion of Prior Art

Queries in a relational database management system (DBMS) typically specify what tables are to be accessed, rather than how those tables are to be accessed, using the standard non-procedural query language, simple query language (SQL). The SQL Query Compiler, and specifically the Query Optimizer (or just Optimizer) component of the Query Compiler, automatically determines the appropriate way to access and join the tables referenced in a single SQL query. This is done by considering many possible access plans, evaluating the estimated cost of each plan, and choosing the cheapest plan in estimated cost. Since the (inner) join operation is both commutative and associative, many possible join sequences need to be evaluated by the Optimizer. In the worst case, the number of different possible join sequences can be exponential in the number of tables. The complexity of this so-called "join (sequence) enumeration" is the major driver of the time to optimize SQL queries.

Currently, DB2® Universal Data Base (UDB) on the z/OS® platform and DB2 UDB® for the Linux®, Unix®, and Windows® platforms use the well-known technique of dynamic programming to determine the optimal join ordering. This technique finds the (provably) optimal solution, but in the worst case can have execution times that are exponential in the number of tables referenced by the query. This can become a problem for optimization time for very complex queries, i.e., those referencing more than about 10 tables, depending upon the connectivity and shape of the query graph, as documented in the reference to Ono et al. entitled, "Measuring the Complexity of Join Enumeration in Query Optimization." Such complex queries are becoming increasingly common due to the use of nested views. For example, many queries in Siebel's CRM suite™ and in PeopleSoft® applications have more than 20 tables. For such queries, optimization using dynamic programming consumes a prohibitive amount of time and space. For example, a query having 10 tables could have as many as 2,300 join sequences, but a query having 20 tables could have as many as 4.98 million such sequences. For each such sequence, many alternative ways to implement that sequence are considered, so the number of plans actually considered may be 10 or more times these numbers.

As a result, virtually all DBMS products have devised a heuristic method for rapidly determining a join sequence when the query is very complex, i.e., has more than a handful of tables. For optimizing complex queries with a large number of tables, DB2 UDB for Linux, Unix, and Windows has an alternative join enumeration algorithm called "greedy" that is far more efficient at optimizing than dynamic programming, but may choose plans with sub-optimal execution times. The greedy join enumeration algorithm was disclosed in a paper to Lohman entitled, "Heuristic Method for Joining Relational Data Base Tables." The greedy algorithm greedily chooses the cheapest join at each iteration of the algorithm, without regard for the consequences to later joins. In this respect, it is "myopic", never thinking about the consequences of its choices on future joins; hence, it is not very robust. It is an extremely fast algorithm, being polynomial in the number of tables joined, but in certain circumstances it can produce plans that run slowly because it cannot foresee the consequences of its choices to future joins. For example, choosing the cheapest join first might produce a large number of rows in the intermediate result, making subsequent joins for that query more expensive (cost is roughly proportional to the number of rows to be processed). Sometimes more expensive joins are more selective, i.e., they filter out more unwanted rows, resulting in less work for future joins and therefore possibly a cheaper plan overall. In fact, the greedy algorithm was itself an improvement upon very simplistic algorithms that considered only the number of rows in each intermediate result but not cost, such as in papers by Palermo entitled, "A Data Base Search Problem" and the U.S. patent to Krishna. This was called the "least growth principle". However, basing optimization decisions simply on the number of rows fails to take into consideration that the same number of rows can sometimes be accessed more efficiently if indexes exist. So, for complex queries, the greedy method performs optimization quite fast, but is not very robust because: (1) it myopically decides the join sequence without regard to the future, (2) no one metric is optimal for all possible queries, (3) it produces only one plan join sequence) per query, and (4) it does so without being able to backtrack from decisions later found to be sub-optimal.

Other products may use other heuristics, e.g., Informix® uses a heuristic using the cardinality (i.e., number of rows) and referential integrity constraints between primary keys and foreign keys. This suffers most of the same problems that the greedy heuristic suffers.

There have been many heuristics and algorithms proposed in the open literature on query optimization, such as: simulated annealing, genetic algorithms, iterative improvement, A*, random sampling, and many other variants. A paper by Jarke et al. entitled, "Query Optimization in Database Systems" provides for an overview of query optimization, including join sequence enumeration techniques.

The following patents describe query execution and optimization in general.

The U.S. patent to Shekita et al. (U.S. Pat. No. 5,671,403) provides for an iterative dynamic programming system for query optimization with bounded complexity. Disclosed within is a query optimizer for optimizing join queries in a relational database system by iterative application of dynamic programming to select optimal subgraph join execution plans.

The U.S. patent to Dalal et al. (U.S. Pat. No. 5,701,461) provides for a method and system for accessing a remote database using pass-through queries. The disclosed system includes a query processor to compile the database query, a remote engine to retrieve table structure information and fetch data as needed, and a temporary table manager to manage caching of the fetched data.

The U.S. patent to Krishna (U.S. Pat. No. 6,138,111) provides for a method and apparatus for optimizing the processing of join queries based on join cardinality, wherein specific embodiments implement the methods in relational database management systems.

Whatever the precise merits, features, and advantages of the above-cited references, none of them achieves or fulfills the purposes of the present invention.

SUMMARY OF INVENTION

The present invention provides for a method for optimizing a complex database query via a heuristic join-sequencing algorithm, wherein the complex database query requested by an entity and the optimization method performs any of, or a combination of: (a) multiple passes of the heuristic join-sequencing algorithm identifying multiple plans, with each of said passes performed using a different criterion for choosing a join in a sequence, wherein the plans are compared against a common measure; (b) complex combinations of criteria by which the heuristic join-sequence algorithm selects the next join within a pass; whereby said optimized database query is executed via an optimizer and results of said executed optimized database query is forwarded to said requesting entity.

Additionally, the method of the present invention allows for backtracking to consider alternatives to any particular decision in a sequence by undoing the last join in a sequence and permitting the selection of another join based upon a different criterion.

In a specific implementation, the present invention provides for a method for optimizing complex database queries, wherein the method comprises the following steps: (1) receiving a complex database query; (2) computing a first plan associated with said complex database query using a heuristic join-sequencing algorithm; (3) computing a second plan associated with said complex database query via an extended heuristic join-sequencing algorithm, said extended heuristic join-sequence algorithm performing one additional pass computing said second plan; wherein criterion, C, of each candidate join, J, at each iteration is given as follows:

$$C + W (N-T) R$$
and weight, W, is chosen such that:
$$W > (C2-C1)/(N-T)(R1-R2);$$

wherein C is the cumulative cost to perform join J; N is the number of tables in the query; T is the number of tables joined thus far by join J, including those in join J's inputs; W is the weight (penalty) converting rows to cost; and R is the number of rows produced by join J (i.e., the cardinality); (4) comparing said computed first and second plan and choosing the cheaper plan; and (5) returning the cheaper plan. In an extended embodiment, the method further comprises the step of backtracking to consider alternatives to any particular decision in the sequence by undoing the last join in a sequence and permitting the selection of some other join based upon another join criterion.

Here, (N−T) is used as a measure representing work yet to be completed, as it indicates the remaining number of tables to be joined to answer the query. Another alternative with (M−2) is also envisioned, where M is the total number of nodes in the join graph during the selection process in the greedy join optimization. Thus, (M−2) indicates the number of nodes to be joined to answer the query. Note that M changes as the selection process progresses in the greedy join optimization. In this case, the cost is given by C+W*(M−2)*R.

DESCRIPTION OF THE PREFERRED EMBODIMENTS

Figure 1:
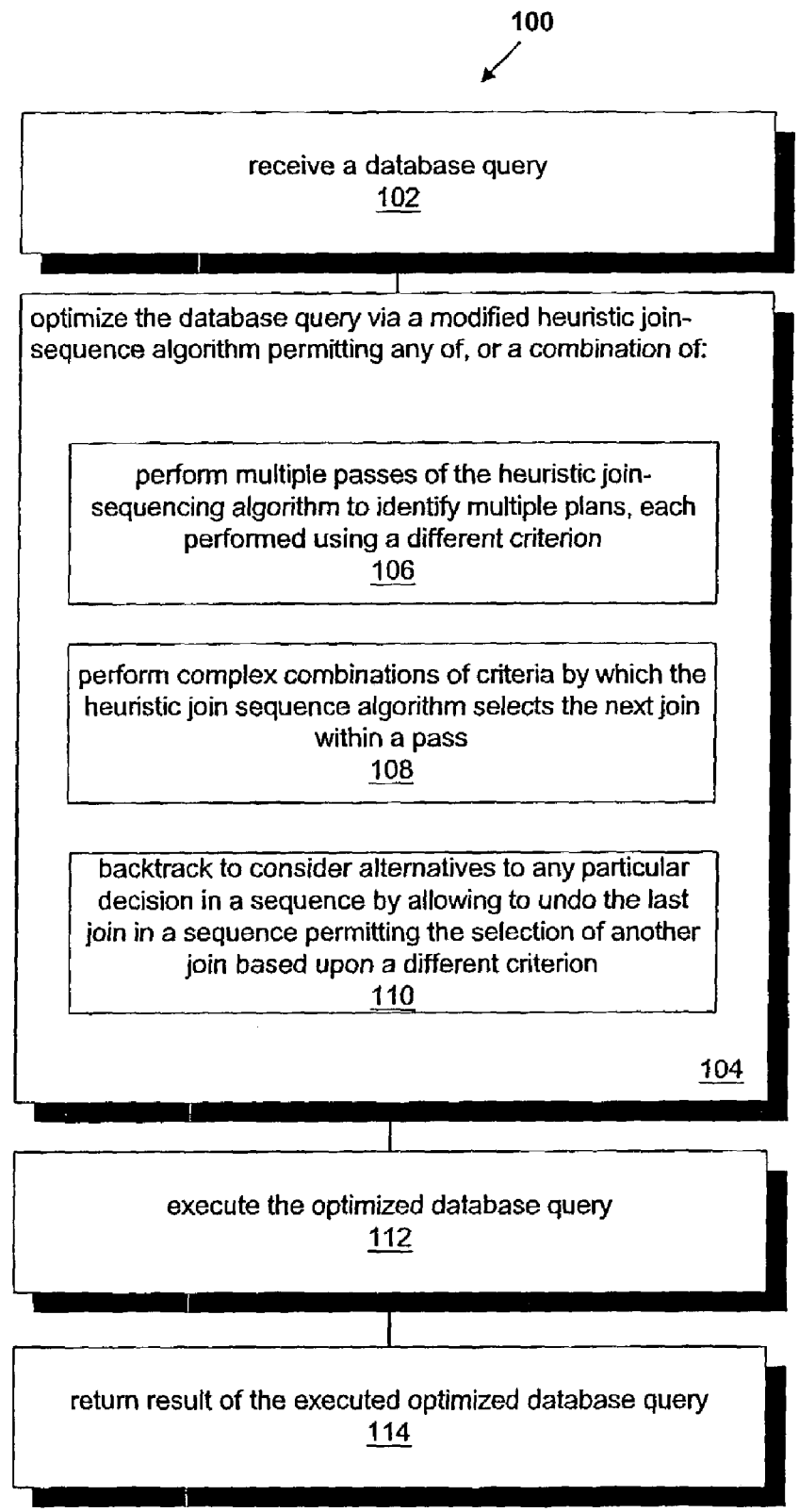
FIG. 1 illustrates a method associated with the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates a method 100 associated with the present invention. In step 102, a complex database query is received. In step 104, the received complex database query is optimized via a join-sequence algorithm (such as a heuristic join-sequence algorithm). The present invention method 100 solves the problems associated with the prior art in a robust manner, while retaining the optimization speed of heuristic methods, by extending any heuristic join-sequencing algorithm to permit any of, or a combination of:

multiple passes of the algorithm, each with a different metric, producing multiple plans 106;

complex combinations of the criteria by which such heuristics make their choices 108; and/or backtracking to consider alternatives to any particular decision in the sequence 110.

Lastly, the optimized database query is executed 112 and the result is returned to the entity forwarding the complex database query 114.

The first extension permits multiple passes of the greedy algorithm, each using a different criterion for choosing each join in the sequence. Each pass may pick a different plan, since a different criterion is used to select the join sequence. However, the plans produced by each pass must ultimately be compared based upon the same criterion, usually (in the preferred embodiment) the total cost of each plan. This permits the selection among several plans that used different criteria for greedily choosing each join, perhaps in a short-sighted way. For example, one criterion could choose a join sequence that appears to be optimal initially (e.g., based upon cost alone) but produces intermediate results that necessitate much more expensive joins later in the sequence; and thus a plan for the entire sequence that is sub-optimal. However, some other criterion might greedily choose an initial sequence whose cost is more expensive for those joins but whose intermediate results are cheaper to join with the remainder of the tables because it initially produces fewer rows by those more expensive joins. By having multiple plans from which to choose, each having a join sequence based upon different criteria, the optimizer is freed somewhat from the myopia of the heuristic (greedy) selection of plans, and therefore has more plans from which to choose the optimal one. The ultimate choice between plans must always be based upon the same criterion (in the preferred embodiment, estimated cost), but the criterion by which the next join in the join sequence is selected may differ from one pass to the next. In its most general form, the criterion by which the next join is selected may even vary within a pass. For example, within a single pass, the weight placed upon the number of rows produced by intermediate results might decrease as the number of joins increases since the cost of having to join more rows decreases as the number of remaining joins decreases—joins that are early in the join sequence and that reduce the number of rows for succeeding joins create much more benefit than those late in the sequence. This change of criteria within a single pass is exploited in the preferred embodiment.

The second extension permits combining criteria for selection of the next join in complex ways. This may permit combining different criteria together in a single pass, thus possibly saving having to perform as many passes, each with a different criterion. Any function can be used to combine any number of criteria for the selection of each join in the sequence, but the preferred embodiment uses a linear weighting function. Even in a linear weighting, the weights and the criteria involved can change from one join to the next. In the preferred embodiment, for example, the function is a weighted sum of the number of rows produced by each join and the estimated cost of that join, where the weight favors the first criterion more at the beginning of the join sequence and the second criterion toward the end of the sequence.

The third extension permits the last join in any join sub-sequence to be "un-done" at any point, permitting the selection of some other join based upon any other join criterion. This "backtracking" prevents the selection of any join by any criterion from being "cast in concrete" for a given pass, and thus allows the sequence chosen within a pass to recover from an earlier choice that might turn out to have sub-optimal consequences later in the sequence, since the choice was made without the benefit of knowing its consequences later in the join sequence. However, allowing such backtracking means that each subsequence and its inputs to any costing criterion must be retained at least until the pass is completed. So, at each step in constructing a sequence of joins within a pass, the algorithm permits either the determination of the next join to construct from all the subsequences constructed thus far, or an "un-doing" of the last one in the chosen sequence.

The algorithm in its most general form is therefore summarized in pseudo-code as follows:

```
For each join j in the sequence of N-1 binary joins, either:
    1. Pick the next join in the sequence, as follows:
        Determine the criterion function C(x, y)
        Best_criterion = infinity; best_plan = empty; (initialize best
            plan and its criterion for this sequence)
        For each pair of intermediate results (join sub-sequences chosen
            thus far in this or previous passes) SSx and SSy,
                Compute the inputs to C(x,y), if not done when
                    constructing those input subsequences
                If C(SSx, SSy) < Best_criterion
                    Best_criterion = C(SSx, SSy)
                    Best_plan = SSx JOIN SSy
                    Best_cost = Cf (SSx, SSy)
                If C(SSy, SSx) < Best_criterion
                    Best_criterion = C(SSy, SSx)
                    Best_plan = SSy JOIN SSx
                    Best_cost = Cf( SSy, SSx)
        Save best_plan as a sub-sequence, along with any metrics needed
            for input to any criterion function C(x,y) resulting from best_plan
            (e.g., its cardinality, number of I/Os, etc.)
OR 2. Un-do the last join in the join sequence constructed thus far for this
    pass (i.e., remove the last join performed from the join sequence Sp,
    leaving its two inputs as sub-sequences)
If all N-1 joins have joined all N tables, (we have a complete plan)
    If Best_cost < Best_overall_cost, (i.e., if this plan is the best
        overall plan thus far)
            Best_overall_cost = best_cost
            Best_overall_plan = best_plan
End (for each join j)
End (for each pass)
```

The preferred embodiment of this general algorithm has been prototyped in DB2 Universal Data Base (UDB) for Linux, Unix, and Windows. It adds just one additional pass using the subject invention, and hence a second greedy solution, to the existing greedy algorithm currently implemented in DB2 UDB, and simply chooses the cheaper (in estimated cost) of the two plans so constructed. This is simply the preferred embodiment, as it provides just one (very simple) way to choose an alternative plan with just one additional pass.

In the new (second) pass, the criterion C of each candidate join J at each iteration of the greedy algorithm is modified as follows:

$$C + W * (N-T) * R$$

where
  $C$ = the cumulative cost to perform join J, i.e., including the cost to produce J's inputs
  $N$ = the number of tables in the query
  $T$ = the number of tables joined thus far by join J, including those in join J's inputs
  $W$ = the weight (penalty) converting rows to cost
  $R$ = the number of rows produced by join J (i.e., the cardinality)

Given a set T of N tables, {T1, T2, . . . , TN}
Best_overall_cost=infinity;
Best_overall_plan=empty;
Determine the cost function Cf(x,y) for selecting among complete plan sequences
For each pass p in the set of optimization passes P, determine a plan as a sequence Sp of join sub-sequences as follows:

Here, (N−T) is used as a measure representing work yet to be completed, as it indicates the remaining number of tables to be joined to answer the query. Another alternative with (M−2) is also envisioned, where M is the total number of nodes in the join graph during the selection process in the greedy join optimization. Thus (M−2) indicates the number of nodes to be joined to answer the query. Note that M changes as the selection process progresses in the greedy join optimization. In this case, the cost will become $C+W*(M-2)*R$.

The weight W can be chosen in any way or could be provided by the user. In the preferred embodiment, W is chosen as follows, to ensure that the plan chosen in the second pass is different from that chosen in the first pass, and only if the cheapest join is not also the join producing the least number of rows.

Recall that the problem arose when the cheapest join was not also the join producing the least number of rows, i.e.,

|       | Plan 1 |      | Plan 2         |
|-------|--------|------|----------------|
| Cost: | C1     | <=   | C2             |
| # of Rows: | R1 | >    | R2 * Threshold | where the treshold can be set by the user.
It should be noted that W is chosen such that: $C1 + W (N - T) R1 > C2 + W (N - T) R2$, or $W (N- T)R1 - W(N - T) R2 > C2 - C1$ or $W > (C2 - C1)/(R1 - R2)$ for $1 <= T <= N$
since $R1 > R2 *$ Threshold.

For simplicity, the algorithm chooses to use the very first computed W once the additional phase is deemed necessary. As an alternative, it is possible to compute a set of W values if there is more than one join producing fewer rows than the cheapest join and to choose one W value to use such as the highest one.

Figure 2:
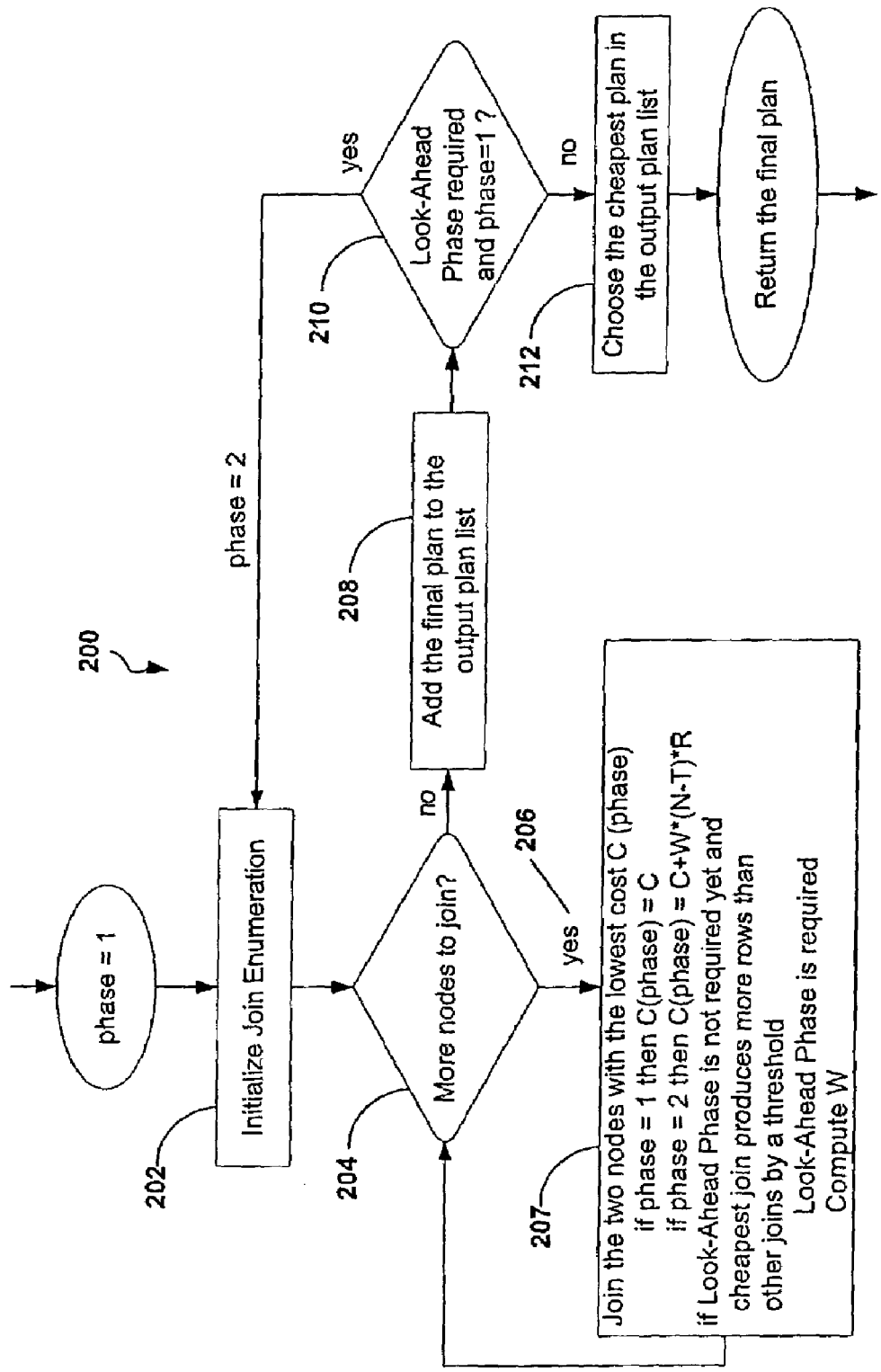
FIG. 2 illustrates a flow chart depicting the method associated with the preferred embodiment of the present invention.

FIG. 2 illustrates a flow chart depicting the method 200 associated with the preferred embodiment of the present invention. First, with a phase set to one, the join enumerations are initialized in step 202. Next, a check is performed in step 204 to see if there are more nodes to join, and in the instance there are more nodes to join 206, the cost with phase=1 is calculated 207 until a first final plan is identified. When the final plan is identified, it is added to the output plan list 208. Next, a check 210 is performed to see if look-ahead phase is required, and in the instance it is required, the phase is set to 2 and steps 204 through 207 is repeated by calculating $C(2)=C+W*(N-T)*R$. Upon joining all the nodes, a second plan is identified with phase=2. Lastly, the first and the second plans are compared to identify the cheapest plan 212.

Thus, the algorithm of the present invention compiles a query much faster than the current dynamic programming algorithm used by DB2, but it gets much better plans than those produced by the Greedy algorithm of DB2 because it is able to choose from multiple plans chosen by different criteria. It is superior to the above-mentioned prior art techniques, as it uses estimated cost rather than just cardinality (but cardinality or number of rows can be one of the criteria used) for deciding the best overall plan.

Additionally, the present invention provides for an article of manufacture comprising computer readable program code contained within implementing one or more modules for robustly optimizing database queries. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) aiding in receiving a database query; (b) optimizing the database query via modifying the heuristic join-sequencing algorithm, wherein the modified heuristic join-sequencing algorithm performs any of, or a combination of: (i) multiple passes of said heuristic join-sequencing algorithm identifying multiple plans, with each of said passes performed using a different criterion for choosing a join in a sequence, wherein said plans are compared against a common measure; (ii) complex combinations of criteria by which said heuristic join-sequence algorithm selects the next join within a pass; and (iii) backtracking to consider alternatives to any particular decision in a sequence by undoing the last join in a sequence and permitting the selection of another join based upon a different criterion; (c) executing said optimized database query; and (d) returning result of said executed optimized database query.

CONCLUSION

A system and method has been shown in the above embodiments for the effective implementation of fast and robust optimization of very complex database queries. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by type of metric/criterion, type of mathematical function for combining different criteria, software/program, computing environment, or specific computing hardware to implement the present invention.

The above enhancements are implemented in various computing environments. For example, the present invention may be implemented on a conventional IBM PC or equivalent, multi-nodal system (e.g., LAN) or networking system (e.g., WAN, Internet, WWW, wireless web). All programming, GUIs, and data related thereto are stored in computer memory, static or dynamic, and may be retrieved by the user in any of: conventional computer storage, display (i.e., CRT), and/or hardcopy (i.e., printed) formats. The programming of the present invention may be implemented by one of skill in the art of database programming.

The invention claimed is:

1. A method for optimizing a complex database query using a join-sequencing algorithm, said complex database query requested by an entity, said optimization method performing any of, or a combination of:
   a. identifying multiple plans via performing multiple passes of said join sequencing algorithm, with each of said passes performed using a different criterion for choosing a join in a sequence, comparing said plans common measure, and identifying an optimal plan among said compared plans; and
   b. performing complex combinations of criteria by which said join-sequence algorithm selects the next join within a pass, and identifying an optimal plan based on said complex combinations of criteria;
   whereby said identified optimal plan is returned to said requesting entity.

2. A method for optimizing a complex database query using a join-sequencing algorithm, said complex database query requested by an entity, as per claim 1, wherein said optimization method additionally performs backtracking to consider alternatives to any particular decision in a sequence by undoing the last join in a sequence and permitting the selection of another join based upon a different criterion, wherein said backtracking is used to identify an optimal plan.

3. A method for optimizing a complex database query using a join-sequencing algorithm, as per claim 1, wherein said join-sequencing algorithm is a heuristic join-sequencing algorithm.

4. A method for optimizing a complex database query using a join-sequencing algorithm, as per claim 1, wherein said join-sequencing algorithm is a greedy algorithm.

5. A method for optimizing a complex database query using a join-sequencing algorithm, as per claim 1, wherein said common measure is cost of each plan and said optimal plan is the cheapest plan.

6. A method for optimizing a complex database query using a join-sequencing algorithm, as per claim 1, wherein said complex combination of criteria is performed based upon a linear weighting function.

7. A method for optimizing a complex database query using a join-sequencing algorithm, as per claim 6, wherein weights and criteria change between joins.

8. A method for optimizing a complex database query using a join-sequencing algorithm, as per claim 1, wherein said complex database query is a SQL query.

9. A method for optimizing a complex database query using a join-sequencing algorithm, as per claim 1, wherein said method is implemented across networks.

10. A method for optimizing a complex database query using a join-sequencing algorithm, as per claim 9, wherein said across network elements comprises any of the following: local area networks (LANs), wide area networks (WANs), or the Internet.

11. A computer based method for robust optimization of complex database queries via a heuristic join-sequencing algorithm, said method comprising the steps of:
   a. receiving a database query from an entity requesting optimization of said database query;
   b. optimizing said database query using said heuristic join-sequencing algorithm, said heuristic join-sequencing algorithm performing any of, or a combination of:
      i. identifying multiple plans via performing multiple passes of said join sequencing algorithm with each of said passes performed using a different criterion for choosing a join in a sequence, comparing said plans against a common measures, identifying an optimal plan among said compared plans;
      ii. performing complex combinations of criteria by which said heuristic join-sequence algorithm selects the next join within a pass, and identifying an optimal plan based on said complex combinations of criteria; and
      iii. backtracking to consider alternatives to any particular decision in a sequence by undoing the last join in a sequence, and permitting the selection of another join based upon a different criterion, said backtracking used to identify an optimal plan;
   c. returning said optimal plan to said requesting entity.

12. A computer based method for robust optimization of complex database queries via a heuristic join-sequencing algorithm, as per claim 11, wherein said heuristic join-sequencing algorithm is a greedy algorithm.

13. A computer based method for robust optimization of complex database queries via a heuristic join-sequencing algorithm, as per claim 11, wherein said common measure is cost of each plan.

14. A computer based method for robust optimization of complex database queries via a heuristic join-sequencing algorithm, as per claim 11, wherein said complex combination of criteria is performed based upon a linear weighting function.

15. A computer based method for robust optimization of complex database queries via a heuristic join-sequencing algorithm, as per claim 14, wherein weights and criteria change between joins.

16. A computer based method for robust optimization of complex database queries via a heuristic join-sequencing algorithm, as per claim 11, wherein said database query is a SQL query.

17. A computer based method for robust optimization of complex database queries via a heuristic join-sequencing algorithm, as per claim 11, wherein said method is implemented across networks.

18. A computer based method for robust optimization of complex database queries via a heuristic join-sequencing algorithm, as per claim 17, wherein said across network elements comprises any of the following: local area networks (LANs), wide area networks (WANs), or the Internet.

19. An article of manufacture comprising computer usable medium having computer readable program code embodied therein which robustly optimizes complex database queries via a heuristic join-sequencing algorithm, said medium comprising:
   a. computer readable program code aiding in receiving a database query from an entity requesting optimization of said database query;
   b. computer readable program code optimizing said database query using said heuristic join-sequencing algorithm, said heuristic join-sequencing algorithm performing any of, or a combination of:
      i. identifying multiple plans via performing multiple passes of said join sequence algorithm, with each of said passes performed using a different criterion for choosing a join in a sequence, comparing said plans against a common measure, and identifying an optimal plan among said compared plans;
      ii. performing complex combinations of criteria by which said heuristic join-sequence algorithm selects the next join within a pass, and identifying an optimal plan based on said complex combinations of criteria; and
      iii. backtracking to consider alternatives to any particular decision in a sequence by undoing the last join in a sequences and permitting the selection of another join based upon a different criterion, said backtracking used to identify an optimal plan;
   c. computer readable program code aiding in returning said identified optimal plan to said requesting entity.

20. An article of manufacture comprising computer usable medium having computer readable program code embodied therein which robustly optimizes complex database queries via a heuristic join-sequencing algorithm, as per claim 19, wherein said heuristic join-sequencing algorithm is a greedy algorithm.

21. An article of manufacture comprising computer usable medium having computer readable program code embodied therein which robustly optimizes complex database queries via a heuristic join-sequencing algorithm, as per claim 19, wherein said complex combination of criteria is performed based upon a linear weighting function.

22. A method for optimizing complex database queries, said method comprising the steps of:
   a. receiving a complex database query from an entity requesting optimization of said complex database query;
   b. computing a first plan associated with said complex database query using a heuristic join-sequencing algorithm;
   c. computing a second plan associated with said complex database query via an extended heuristic join-sequencing algorithms said extended heuristic join-sequence algorithm performing one additional pass computing said second plan, said plan using a criterion C for selecting each join that is different than that of the first pass, wherein said criterion, C, of each candidate join, J, at each iteration is given as follows: $C+W(N-T)R$, wherein N is the number of tables in said query, T is the number of tables joined thus far by join, J, R is the cardinality, and W is the weight to convert rows to cost;
   d. comparing said computed first and second plan and choosing the cheaper plan; and
   e. returning said chosen cheaper plan to said requesting entity.

23. A method for optimizing complex database queries, as per claim 22, wherein weight, W, is chosen such that $W>(C2-C1)/(N-T)(R1-R2)$.

24. A method for optimizing complex database queries, as per claim 22, wherein said criterion, C, of each candidate join, J, at each iteration is given as follows:

$$C+W(M-2)R$$

wherein weight, W, is chosen such that $W>(C2-C1)/(M-2)(R1-R2)$.

25. A method for optimizing complex database queries, as per claim 22, wherein said method further comprises the step of backtracking to consider alternatives to any particular decision in the sequence by undoing the last join in a sequence and permitting the selection of some other join based upon another join criterion.

26. A method for optimizing complex database queries, as per claim 22, wherein said heuristic join-sequencing algorithm is a greedy algorithm.

27. An article of manufacture comprising computer usable medium having computer readable program code embodied therein for optimizing complex database queries, said medium comprising:
   a. computer readable program code aiding in receiving a complex database query from an entity requesting optimization of said database query;
   b. computer readable program code computing a first plan associated with said complex database query using a heuristic join-sequencing algorithm;
   c. computer readable program code computing a second plan associated with said complex database query via an extended heuristic join-sequencing algorithm, said extended heuristic join-sequence algorithm performing one additional pass computing said second plan, said second plan using a criterion, C, for selecting for selecting each join that is different that that of the first pass, wherein said criterion, C, of each candidate join, J, at each iteration is given as follows; $C+W(N-T)R$, wherein N is the number of tables in said query, T is the number of tables joined thus far by join, J, R is the cardinality, and W is the weight to convert rows to cost;
   d. computer readable program code comparing said computed first and second plan and choosing the cheaper plan; and
   e. computer readable program code aiding in returning said chosen cheaper plan to said requesting entity.

28. An article of manufacture comprising computer usable medium having computer readable program code embodied therein for optimizing complex database queries, as per claim 27, wherein weight, W, is chosen such that $W>(C2-C1)/(N-T)(R1-R2)$.

29. An article of manufacture comprising computer usable medium having computer readable program code embodied therein for optimizing complex database queries, as per claim 27, wherein said criterion, C, of each candidate join, J, at each iteration is given as follows:

$$C+W(M-2)R$$

wherein weight, W, is chosen such that $W>(C2-C1)/(M-2)(R1-R2)$.

30. An article of manufacture comprising computer usable medium having computer readable program code embodied therein for optimizing complex database queries, as per claim 27, wherein said medium further comprises computer readable program code to backtrack to consider alternatives to any particular decision in the sequence by undoing the last join in a sequence and permitting the selection of some other join based upon another join criterion.

31. An article of manufacture comprising computer usable medium having computer readable program code embodied therein for optimizing complex database queries, as per claim 27, wherein said heuristic join-sequencing algorithm is a greedy algorithm.

* * * * *